(12) United States Patent
Gluzberg et al.

(10) Patent No.: US 9,105,059 B2
(45) Date of Patent: Aug. 11, 2015

(54) ELECTRONIC COMMERCE SYSTEM UTILIZING CUSTOM MERCHANT CALCULATIONS

(75) Inventors: Eugene Gluzberg, Great Neck, NY (US); Timothy M. Dierks, New York, NY (US)

(73) Assignee: GOOGLE INC., Mountain View, CA (US)

( * ) Notice: Subject to any disclaimer, the term of this patent is extended or adjusted under 35 U.S.C. 154(b) by 2832 days.

(21) Appl. No.: 11/426,833

(22) Filed: Jun. 27, 2006

(65) Prior Publication Data

US 2007/0299732 A1    Dec. 27, 2007

(51) Int. Cl.
*G06Q 30/00* (2012.01)
*G06Q 30/06* (2012.01)

(52) U.S. Cl.
CPC ............ *G06Q 30/06* (2013.01); *G06Q 30/0635* (2013.01); *G06Q 30/0641* (2013.01)

(58) Field of Classification Search
CPC ................................. G06Q 30/0609–30/0645
USPC ..................................... 705/26, 27, 26.1–27.2
See application file for complete search history.

(56) References Cited

U.S. PATENT DOCUMENTS

| | | |
|---|---|---|
| 5,191,410 A | 3/1993 | McCalley et al. |
| 5,715,314 A | 2/1998 | Payne et al. |
| 5,918,213 A | 6/1999 | Bernard et al. |
| 5,999,914 A | 12/1999 | Blinn et al. |
| 6,029,141 A | 2/2000 | Bezos et al. |
| 6,134,307 A | 10/2000 | Brouckman et al. |
| 6,167,382 A | 12/2000 | Sparks et al. |
| 6,167,383 A | 12/2000 | Henson |
| 6,499,052 B1 | 12/2002 | Hoang et al. |
| 6,598,027 B1 | 7/2003 | Breen, Jr. et al. |
| 6,850,917 B1 | 2/2005 | Hom et al. |
| 6,925,444 B1 | 8/2005 | McCollom et al. |
| 6,934,690 B1 | 8/2005 | Van Horn et al. |

(Continued)

FOREIGN PATENT DOCUMENTS

WO    WO-02/29508 A2 *   4/2002

OTHER PUBLICATIONS

Business Editors/High, T. W. (Jul. 7, 1998). E-commerce firm receives national recognition for achievement in web development; multimedia live wins CIO web business 50/50 award for shopper zone. Business Wire Retrieved from http://search.proquest.com/docview/446873068?accountid=14753.*

(Continued)

*Primary Examiner* — Resha Desai
(74) *Attorney, Agent, or Firm* — Johnson, Marcou & Isaacs, LLC

(57) ABSTRACT

A customer interacts with merchants to identify items to purchase, and the merchants provide virtual shopping carts identifying the items to a broker. The cart requests that the broker utilize custom merchant calculations for the transaction, such as for determining shipping costs. The customer interacts with the broker to identify customer information, such as a shipping address, and to purchase the items. The broker sends the customer information to the merchant and requests that the merchant perform the custom calculations. If the merchant provides a valid response to the request, the broker uses the merchant calculations to calculate the total price for the transaction. If the merchant provides an invalid response, the broker utilizes backup calculations specified in the cart to calculate the price.

42 Claims, 5 Drawing Sheets

(56) References Cited

U.S. PATENT DOCUMENTS

| | | | |
|---|---|---|---|
| 6,993,502 | B1 | 1/2006 | Gryglewicz et al. |
| 7,089,198 | B2 | 8/2006 | Freedenberg et al. |
| 7,197,475 | B1 | 3/2007 | Lorenzen et al. |
| 2001/0007099 | A1* | 7/2001 | Rau et al. ................ 705/26 |
| 2002/0016766 | A1 | 2/2002 | Raja |
| 2002/0120475 | A1 | 8/2002 | Morimoto |
| 2002/0120530 | A1* | 8/2002 | Sutton et al. ............. 705/26 |
| 2002/0120864 | A1 | 8/2002 | Wu et al. |
| 2002/0194087 | A1* | 12/2002 | Spiegel et al. ............ 705/26 |
| 2003/0033205 | A1 | 2/2003 | Nowers et al. |
| 2003/0050855 | A1 | 3/2003 | Jaffe et al. |
| 2003/0065577 | A1 | 4/2003 | Haynes et al. |
| 2003/0093320 | A1 | 5/2003 | Sullivan |
| 2003/0200156 | A1* | 10/2003 | Roseman et al. ......... 705/27 |
| 2004/0002906 | A1 | 1/2004 | Von Drehnen et al. |
| 2004/0030619 | A1 | 2/2004 | Stokes |
| 2004/0073498 | A1 | 4/2004 | Breen et al. |
| 2004/0117261 | A1* | 6/2004 | Walker et al. ............ 705/14 |
| 2004/0254844 | A1 | 12/2004 | Torres |
| 2005/0027617 | A1* | 2/2005 | Zucker et al. ............ 705/26 |
| 2005/0033694 | A1 | 2/2005 | Perrin |
| 2005/0108104 | A1 | 5/2005 | Woo |
| 2005/0204041 | A1 | 9/2005 | Blinn et al. |
| 2005/0228750 | A1 | 10/2005 | Olliphant et al. |
| 2005/0256806 | A1 | 11/2005 | Tien et al. |
| 2006/0097044 | A1 | 5/2006 | Boyd et al. |
| 2006/0122895 | A1 | 6/2006 | Abraham et al. |
| 2006/0248011 | A1* | 11/2006 | Hecht-Nielsen et al. ..... 705/44 |
| 2007/0043636 | A1 | 2/2007 | Foster |
| 2008/0120129 | A1 | 5/2008 | Seubert |

OTHER PUBLICATIONS

PCT International Search Report and Written Opinion, PCT/US07/72269, Aug. 14, 2008, 12 Pages.

"Happy Birthday Yahoo! Canada Shopping", Canada NewsWire, Nov. 26, 2001, p. 1, [online] Retrieved on Jul. 8, 2009] Retrieved from the internet <URL:http://proquest.umi.com/pqdweb?did=91659103& sid=5&Fmt=3&clientId=19649&RQT=309&VName=PQD>.

Waiter.com—Share your order information, Waiter.com, Inc., 1995-2006, [online] [Retrieved on Mar. 10, 2006], Retrieved on the Internet<URL:http://www.waiter.com/wwwsys/shareinfo.html>.

"Shopping Cart at PoshTots", PoshTots LLC, 2001-2006, [online] [Retrieved from the Internet<URL:http://www.poshtots.com/shopcart/shopcart.asp>.

"Touratech-USA.command CycoActive.com shared Shopping Cart", Touratech USA, [online] [Retrieved on Apr. 6, 2006] Retrieved from the Internet<URL:http://www.touratech-usa.com/shop/shoppingcart.lasso?-session=touratech:B0DFDE2CC5A86 CA5B1487 ... >.

Amazon.com—Enhancing Your Shopping Experience, Listmania ® Lists, [online] [Retrieved on Mar. 10, 2006] Retrieved on the Internet<URL:http://www.amazon.com/exec/obidos/tg/browse/-/14279651/sr%3D53/104-4789231-0552724>.

PCT International Search Report and Written Opinion, PCT/US06/14251, Sep. 10, 2007, 6 Pages.

"Statement in Accordance with the Notice From the European Patent Office Dated Oct. 1, 2007 Concerning Business Methods," Journal of the European Patent Office, Nov. 1, 2007, p. 592.

Supplementary European Search Report, European Patent Application No. EP 06750318, Jun. 23, 2010, 6 Pages.

* cited by examiner

ELECTRONIC COMMERCE SYSTEM UTILIZING CUSTOM MERCHANT CALCULATIONS

CROSS-REFERENCE TO RELATED APPLICATIONS

This application is related to U.S. patent application Ser. No. 11/112,176, filed Apr. 22, 2005, entitled "Distributed Electronic Commerce System With Centralized Point Of Purchase," to U.S. patent application Ser. No. 11/299,168, filed on Dec. 29, 2005, entitled "Distributed Electronic Commerce System with Centralized Virtual Shopping Carts," to U.S. patent application Ser. No. 11/477,012, filed Jun. 27, 2006, entitled "Distributed Electronic Commerce System with Independent Third Party Virtual Shopping Carts," and to U.S. patent application Ser. No. 11/426,838 filed Jun. 27, 2006, entitled "Determining Taxes in an Electronic Commerce System," each of which is hereby incorporated by reference herein in its entirety.

BACKGROUND

This invention pertains in general to electronic commerce and in particular to determining shipping rates, taxes, and other costs in an electronic commerce system.

Electronic commerce on the Internet has become commonplace. There are many merchants offering goods and services via web sites on the Internet, and there are an even greater number of customers who purchase the goods and services. In many cases, the electronic commerce transactions involve physical goods. For example, many customers purchase items such as books, compact disks (CDs) and DVDs via the Internet. Customers can also purchase electronic content such as downloadable text, music, and access to web sites that provide news or entertainment stories.

Most electronic commerce sites on the Internet use ad hoc purchasing systems. For example, a web-based music merchant typically has a purchasing system that is valid for only that merchant's family of web sites. Therefore, a customer must establish an account and/or provide payment information to each merchant that the customer patronizes. These separate accounts are inconvenient to both parties. The merchant must maintain a dedicated account management and payment system. The customer must establish separate accounts with numerous merchants.

Due to these inconveniences, customers are often reluctant to purchase items from smaller or relatively unknown merchants. These merchants lack the brand recognition and trust associated with larger, better known merchants. Therefore, the customers hesitate to engage in risky behavior, such as providing credit card numbers, shipping addresses, or other personally-identifiable information to the merchants.

One solution to the problem described above is to provide a centralized point of purchase operated by a trusted entity. The customer provides the personally-identifiable information to only the trusted entity, and the trusted entity performs the purchase transaction on behalf of the merchant. A difficulty with using a centralized point of purchase in this manner is that both the merchant and trusted entity lack information required to complete the transaction. For example, the merchant does not know the customer's address and cannot determine the shopping costs or sales taxes to collect for the purchase. The trusted entity operating the centralized point of purchase, on the other hand, knows the address, but does not necessarily know how to calculate shipping costs, taxes, or the effect of coupons on the items involved in the transaction. This problem is especially acute when the merchant uses complex or unique business logic, or a tight dependence on internal state, to perform these calculations. As a result, there is a need in the art for an electronic commerce system that allows the trusted entity operating the centralized point of purchase to calculate the total price for the transaction while overcoming the problems described above.

SUMMARY

The above need is met by a method of conducting an electronic commerce transaction that allows the centralized point of purchase, e.g., a broker, to use merchant custom calculations for one or more aspects of the transaction. In one embodiment, the method receives a virtual shopping cart for the customer from a remote merchant. The cart identifies an item sold by the merchant and indicates that custom calculations are used to determine the price for the transaction. The method identifies customer information regarding the transaction through interactions with the customer at the broker's domain, and provides the customer information to the merchant. In addition, the method requests that the merchant utilize the customer information to perform the custom calculations. The method determines the price for the transaction in response to the results received from the merchant and conducts the electronic commerce transaction at the determined price without the customer leaving the domain of the broker.

In one embodiment, a system and computer program product for conducting an electronic commerce transaction include a communications module for receiving data representing a virtual shopping cart for the customer from a remote merchant. The cart identifies an item sold by the merchant and indicates that custom calculations are used to determine the price for the transaction. The system and product also include a purchase transaction module for identifying customer information regarding the transaction through interactions with the customer at a domain of a broker, for determining the price for the transaction responsive to results of a custom calculation request provided to the merchant, and for conducting the electronic commerce transaction with the customer at the determined price without the customer leaving the domain of the broker. Further, the system and product include a calculations module for requesting from the merchant results of custom calculations utilizing the customer information, and providing the results of the custom calculations request to the purchase transaction module.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

A. Overview

Figure 1:
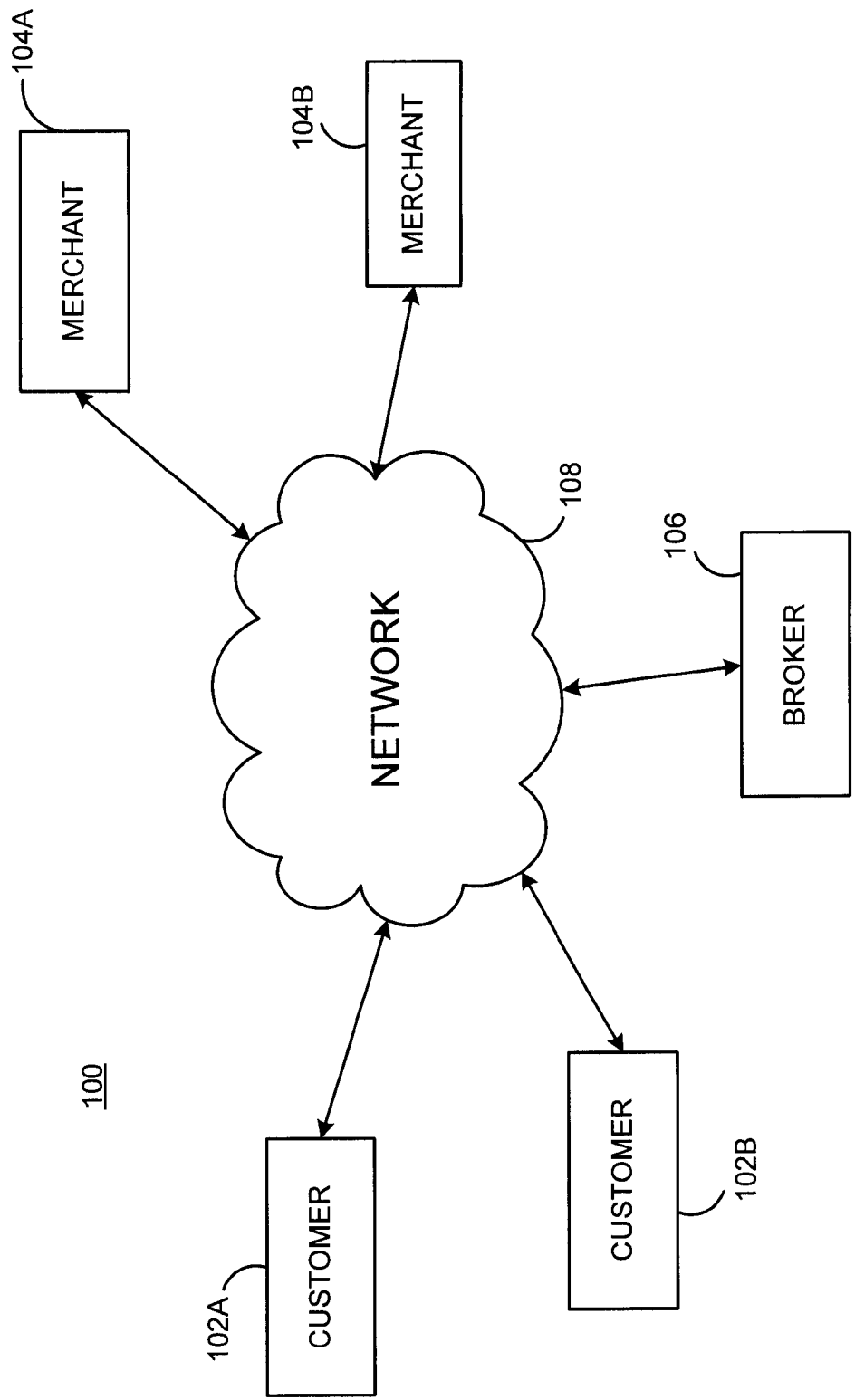
FIG. 1 is a high-level block diagram of a computing environment according to one embodiment.

FIG. 1 is a high-level block diagram of a computing environment 100 according to one embodiment of the present invention. FIG. 1 illustrates two customers 102A and 102B, two merchants 104A and 104B, and a broker 106 connected by a network 108. FIG. 1 and the other figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral (e.g. "104" in the text refers to reference numerals "104A" and/or "104B" in the figures).

The customer 102 in this embodiment represents an entity that obtains items via the network 108 through purchases or other types of transactions. The customer 102 is sometimes referred to as the "buyer" and the transaction is sometimes referred to as a "sale" or "purchase." As used herein, these terms also refer to other types of transactions, regardless of whether the customer is technically a "buyer" or the transaction is technically a "purchase." End-users acting as customers 102 can include end-users purchasing items for their own use or as gifts, and/or end-users purchasing items for the use of a company or other enterprise with which the end-users are associated.

In one embodiment, the customer 102 includes a computer system utilized by an end-user to communicate with other computers on the network 108 in order to effect a purchase. The computer system, for example, can be a personal computer executing a web browser such as MICROSOFT INTERNET EXPLORER® that allows the end-user to retrieve and display content from web servers and other computer systems on the network 108. In other embodiments, the customer 102 includes a network-capable device other than a computer system, such as a personal digital assistant (PDA), a cellular telephone, a pager, a television "set-top box" etc. Although FIG. 1 illustrates two customers 102, embodiments of the present invention can have thousands or millions of customers participating in the electronic commerce system described herein. Only two customers 102 are illustrated in order to simplify and clarify the present description.

Similarly, the merchant 104 represents an entity that sells items on the network 108 or makes items available through other types of transactions. The merchant 104 offering an item to the buyer is sometimes referred to as the "seller" and the transaction is sometimes referred to as a "sale" or "purchase." As used herein, these terms also refer to other types of transactions, regardless of whether the merchant is technically a "seller" or the transaction is technically a "sale." Although FIG. 1 illustrates only two merchants 104, embodiments of the present invention can have many merchants participating in the electronic commerce system. Only two merchants 104 are illustrated in order to simplify and clarify the present description.

In one embodiment, the merchant 104 includes a computer system acting as a web server that is utilized to offer the items to potential customers 102. The merchant 104 is said to be "online," meaning that the merchant provides a presence on the network 108. The items offered by the merchant 104 can include tangible items such as books, CDs, DVDs, digital cameras and other types of electronic goods, etc. The items offered by the merchant 104 can also include intangible items such as services and electronic content such as web pages, downloadable files, streaming media, etc.

In one embodiment, the merchant 104 allows customers 102 to shop using a "shopping cart" metaphor. A customer 102 places an item in a virtual shopping cart. When the customer desires to purchase the items in the shopping cart, the customer chooses a "purchase" option or equivalent on the merchant's web site. In one embodiment, the customer 102 does not provide any personally-identifiable information, such as a name, address, or credit card number, to the merchant 104.

The merchant 104 encodes information describing the transaction in the virtual shopping cart. This information identifies the item, the quantity of the item being purchased, and the cost of the item. In addition, the information in the cart includes data about the transaction, including data describing shipping options and taxes to collect. In one embodiment, the merchant 104 optionally flags elements of the transaction as using custom calculations performed by the merchant. For example, the merchant 104 can flag the shipping rates, taxes, and/or use of coupons and gift certificates as custom merchant calculations. The merchant 104 encodes into the shopping cart a network address, such as a uniform resource locator (URL), that identifies the merchant server that performs the custom calculations (or serves as the interface to a custom calculations module).

The broker 106 represents an entity that serves as an intermediary for the transaction between the customer 102 and the merchant 104. In one embodiment, the broker 106 operates a system that functions as a centralized place that the customers 102 can use to pay for items offered by the merchants 104. Thus, the customers 102 can patronize multiple merchants 104 while providing their payment information to only the broker 106. Although FIG. 1 illustrates only a single broker 106, embodiments of the present invention can have multiple brokers participating in the electronic commerce system. In one embodiment, the broker 106 is said to be "remote" from the customer 102 and/or merchant 104. "Remote" in this context means that the broker is logically separate from the customer and/or merchant, and does not necessarily refer to a physical distance between the entities.

In one embodiment, the broker 106 is within a different "domain" than the customer 102 and/or merchant 104. As used here, the term "domain" generally refers to a sphere of influence. A broker 106 and merchant 104 are in different domains when they are independent of each other and lack a shared point of control. There is not necessarily a relationship between the domain in which a broker 106 and/or merchant 104 reside and the domain names utilized by those entities on the network 108, although the use of different domain names may constitute evidence that the broker and merchant are independent and thus in different domains. In some embodiments, the broker 106 is within the same domain as some customers 102 and/or merchants 104, and in a different domain than other customers and/or merchants.

In one embodiment, the broker 106 receives a customer's shopping cart from the merchant 104 and/or the customer 102. The broker 106 conducts a transaction with the customer 102 to enable the customer to purchase the items in the shopping cart. During the transaction, the broker 106 provides one or more web pages to the customer 102 that allow the broker to learn information about the customer 102 and transaction, such as the customer's shipping address, payment information, and/or a coupon code. In one embodiment, the broker 106 provides the customer 102 with only a single web page, and the broker dynamically updates portions of the web page as the customer selects the options for the transaction. For example, the broker 106 updates the web page in real-time to display actual shipping costs when the user provides a shipping address and/or selects a shipping method.

If the virtual shopping cart received by the broker 106 indicates that the merchant 104 flagged an aspect of the transaction as using custom calculations (which may be the case when the merchant lacks sufficient information to perform the custom calculations), the broker 106 obtains the information the merchant lacks by, for example, requesting the information from the customer 102 and contacts the merchant using the network address supplied in the cart. The broker 106 supplies the merchant with the information, which allows the merchant 104 to perform the custom calculations. The information sent by the broker 106 to the merchant 104 can include, for example, information received in the shopping cart, the possible ship-to addresses for the customer 102, one or more coupon/gift certificate codes received from the customer, and/or other information that the merchant might use to perform its custom calculations. The merchant 104 performs the calculations and provides the results to the broker 106 quickly. Optionally, the broker 106 updates the customer web page to show a prompt indicating that the merchant 104 is performing the calculations, such as "determining shipping costs." In addition, the broker 106 disables the ability to buy an item while the calculations are being performed, e.g., by graying-out a "place order now" button. The merchant 104 quickly performs the calculations and provides the results to the broker 106. The broker 106 updates the customer web page quickly so that the customer 102 sees the results of the custom calculations nearly instantaneously. The above described exchange of information between the broker 106 and the merchant 104 can be completed while the customer web page is being provided to the customer 102, who consequently can complete the purchase without having to leave the customer web page or open a new web page to interact with the merchant. The purchase, in one embodiment, can be completed in a single user session, which, in accordance with World Wide Web Consortium, can be generally defined as a delimited set of clicks across a server. For connectionless HTTP protocol, delimiting the clicks of a single user session can be based, for example, on hidden form fields, cookies having session IDs, or URL rewriting. For HTTP protocols that support persistent connections, clicks of a single user session can be defined to be delimited by (i) an establishment of a persistent connection between a server and a browser and (ii) a closing of the persistent connection.

Custom calculations thus allow the customer 102 to interface with the broker 106 and change aspects of the transaction, such as the shipping address, and see quick updates to the price of the transaction, even though the merchant 104 is performing calculations that factor into the price. In addition, the custom calculations allow the customer 102 to conduct the entire transaction while interfacing with only the broker 106. The customer 102 can providing a shipping address and/or perform other tasks that might change the total price of the transaction without needing to interrupt the purchase transaction, leave the broker's domain, and interface with the merchant 104.

The network 108 represents the communication pathways between the customers 102, merchants 104, and broker 106. In one embodiment, the network 108 is the Internet. The network 108 can also utilize dedicated or private communications links that are not necessarily part of the Internet. In one embodiment, the network 108 uses standard communications technologies and/or protocols. Thus, the network 108 can include links using technologies such as 802.11, integrated services digital network (ISDN), digital subscriber line (DSL), asynchronous transfer mode (ATM), etc. Similarly, the networking protocols used on the network 108 can include multiprotocol label switching (MPLS), the transmission control protocol/Internet protocol (TCP/IP), the hypertext transport protocol (HTTP), the simple mail transfer protocol (SMTP), the file transfer protocol (FTP), the short message service (SMS) protocol, etc. The data exchanged over the network 108 can be represented using technologies and/or formats including the hypertext markup language (HTML), the extensible markup language (XML), etc. In addition, all or some of links can be encrypted using conventional encryption technologies such as the secure sockets layer (SSL), HTTP over SSL (HTTPS), and/or virtual private networks (VPNs). In another embodiment, the entities can use custom and/or dedicated data communications technologies instead of, or in addition to, the ones described above.

II. System Architecture

Figure 2:
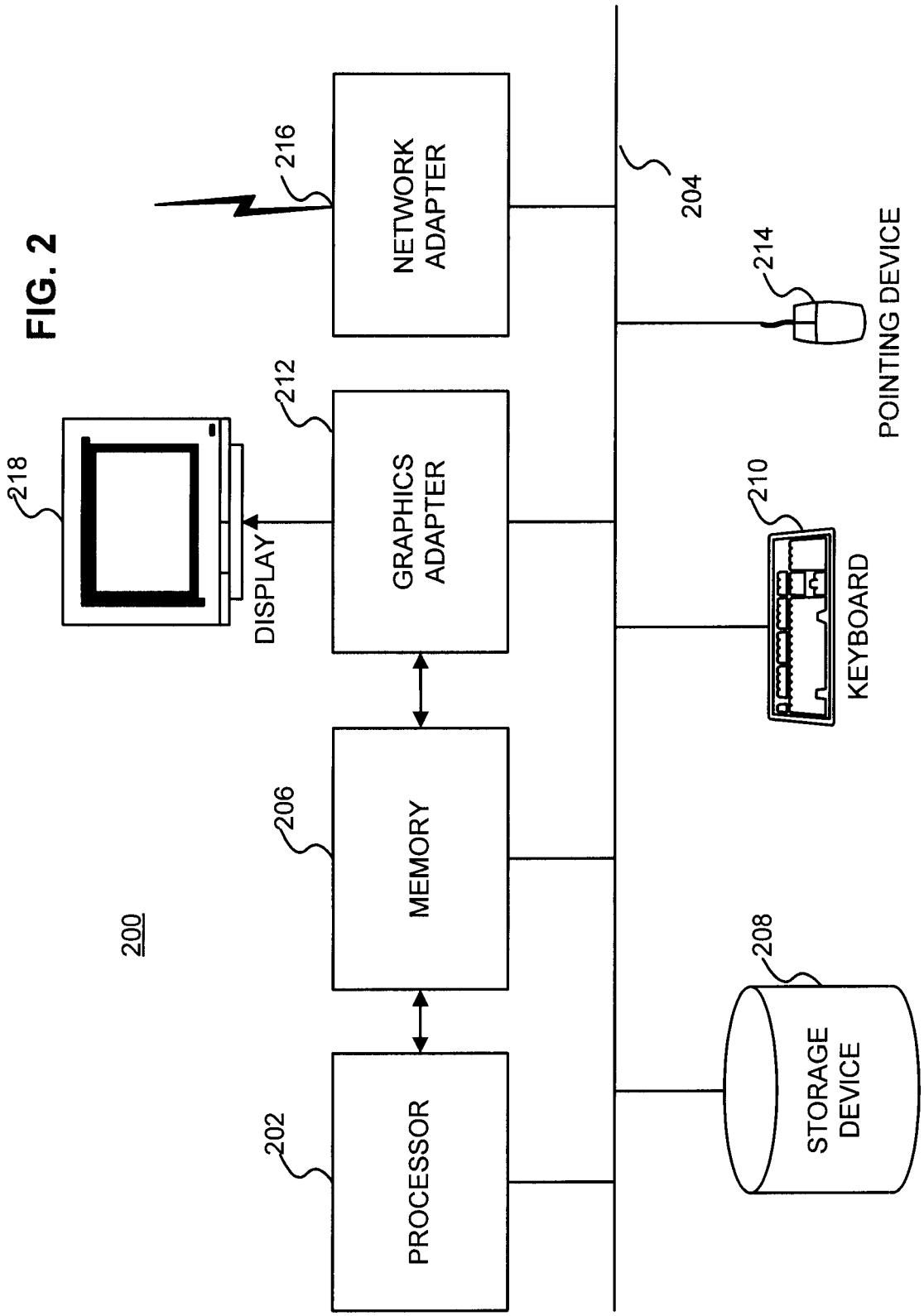
FIG. 2 is a high-level block diagram illustrating a functional view of a typical computer system for use as one of the entities illustrated in the environment of FIG. 1 according to one embodiment.

FIG. 2 is a high-level block diagram illustrating a functional view of a typical computer system 200 for use as one of the entities illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 108.

As is known in the art, the computer system 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computer systems 200 utilized by the entities of FIG. 1 can vary depending upon the embodiment and the processing power utilized by the entity. For example, the customer 102 typically requires less processing power than the merchant 104 and broker 106. Thus, the customer computer system can be a standard personal computer system. The merchant and broker computer systems, in contrast, may comprise more powerful computers and/or multiple computers working together to provide the functionality described herein.

Figure 3:
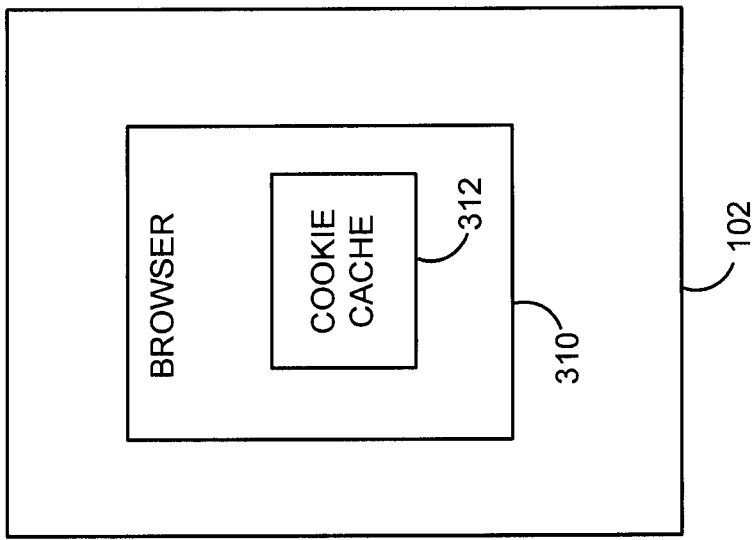
FIG. 3 is a high-level block diagram illustrating modules within the customer according to one embodiment.

FIG. 3 is a high-level block diagram illustrating modules within a customer 102 according to one embodiment. Those of skill in the art will recognize that other embodiments can have different and/or other modules than the ones described here, and that the functionalities can be distributed among the modules in a different manner.

As shown in FIG. 3, the customer 102 includes a browser module 310 that allows the customer to view web pages provided by the merchant 104, broker 106, and/or other entities on the network 108. In one embodiment, the browser module 310 is a conventional web browser, such as MICROSOFT INTERNET EXPLORER® or MOZILLA FIREFOX®. In one embodiment, the browser module 310 maintains a cookie cache 312 that stores cookies associated with web sites on the network 108. The merchant 104 and broker 106 can communicate with the browser module 310 and instruct it to create cookies in the cookie cache 312 holding certain information. The browser module 310 provides the cookie to the merchant 104 and/or broker 106 when the browser connects to the site that created it or another site with authorization to access the cookie.

Figure 4:
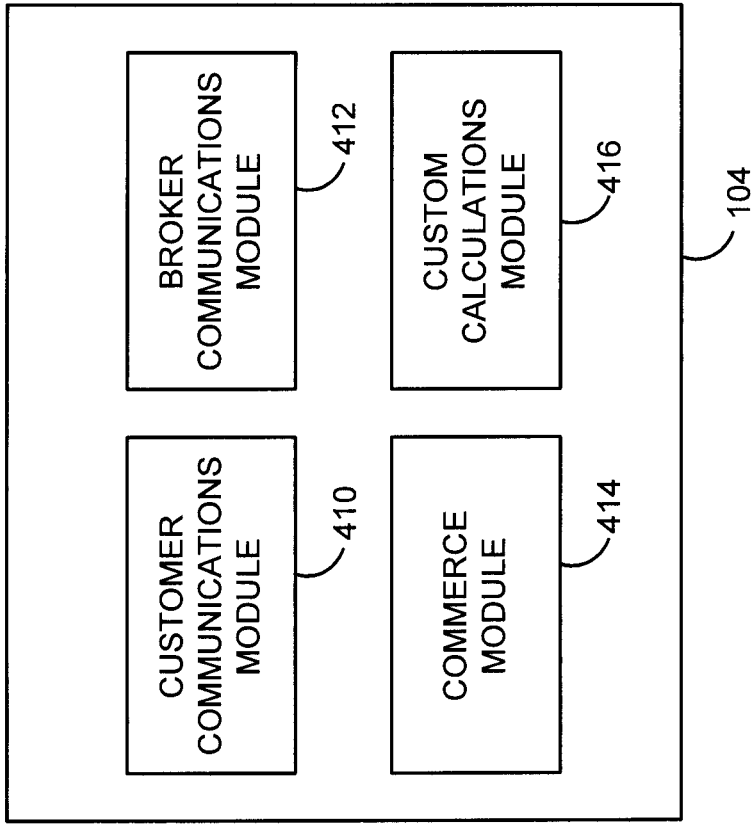
FIG. 4 is a high-level block diagram illustrating modules within the merchant according to one embodiment.

FIG. 4 is a high-level block diagram illustrating modules within a merchant 104 according to one embodiment. Those of skill in the art will recognize that other embodiments can have different and/or other modules than the ones described here, and that the functionalities can be distributed among the modules in a different manner.

A customer communications module 410 communicates with the customer 102 via the network 108. In one embodiment, the customer communications module 410 includes a web server that provides web pages to the customer 102 and receives end-user input sent over the network 108 by the customer's browser module 310. The customer communications module 410 thus allows a customer to navigate the merchant's web site.

In one embodiment, a broker communications module 412 communicates with the broker 106 via the network 108. In one embodiment, merchant-broker communications are conducted via XML-encoded messages exchanged over SSL, HTTPS, and/or HTTP. In another embodiment, the merchant 104 and broker 106 use the web services description language (WSDL). The broker communications module 412 uses WSDL to describe the services it provides and ascertain the services provided by the broker 106. The broker communications module 412 uses XML-based remote procedure calls (RPCs) to provide information to the broker 106 and receive information in return. In other embodiments, the broker communications module 412 communicates with the broker 106 using other techniques and/or protocols, such as via email messages, HTML web pages intended for review by human users, proprietary communications protocols, etc.

A commerce module 414 operates in tandem with the customer communications module 410 and allows the customer 102 to engage in electronic commerce with the merchant 104. In general, the commerce module 414 allows the merchant 104 to create and manage a catalog of items available for sale. The customer 102 can browse the catalog and indicate items that the customer 102 desires to purchase. In one embodiment, the commerce module 414 includes functionality from the open source osCommerce package. The commerce module 414 utilizes a shopping cart metaphor where items selected by the customer 102 are placed in a virtual shopping cart. When this description refers to "placing" or "storing" an item in a cart, it should be understood that a virtual representation of the item is actually stored.

In one embodiment, the commerce module 414 provides the customer 102 with one or more payment options at the time of checkout. One option references a payment system provided by the broker 106. The broker's payment system may be more desirable to a customer 102 when, for example, the merchant 104 is not well known to the customer. The broker 106 may be well known to the customer 102 and an entity to which the customer 102 is comfortable providing payment information. In one embodiment, the commerce module 414 provides a graphic, slogan, and/or other indicia that represents the broker 106 and is designed to convey a sense of trustworthiness to the customer 102.

When the customer selects the broker payment system, or at another time, the commerce module 414 sends the shopping cart to the broker 106. In one embodiment, the commerce module 414 uses the customer communications module 410 to provide the shopping cart to the customer 102 and direct the customer's browser module 310 to send it to the broker 106. The commerce module 414 can perform this latter task, for example, by using a HTTP GET method that codes the shopping cart into a uniform resource locator (URL) that references the broker 106, and redirecting the customer's browser 310 to the coded URL. In another example, the commerce module 414 uses a HTTP POST method that codes the shopping cart into the body of a request made from the customer's browser 110 to the broker 106. In another embodiment, the commerce module 414 uses the broker communications module 412 to send the shopping cart directly to the broker 106.

In one embodiment, the commerce module 414 encodes the shopping cart using XML. The broker 106 or another entity provides a XML schema definition (XSD) to the merchant 104 that describes how to encode information about the item, shipping, taxes, and other aspects of the transaction in the shopping cart. The merchant 104 creates the shopping cart according to the XSD. In one embodiment, the commerce module 414 digitally signs the shopping cart to prevent third parties from modifying it.

The virtual representation of the item includes information describing the item, including the name, price, and quantity of the item, a textual description of the item, a merchant identification (ID) that uniquely identifies the merchant 104, and/or private merchant data that might be opaque to entities other than the merchant 104. Further, in one embodiment the commerce module 414 places information in the shopping cart describing possible shipping methods and costs, anticipated shipping dates, and/or order processing times for given items. Likewise, the shopping cart information can include tax information describing how to calculate taxes for the item.

In one embodiment, the commerce module 414 places information in the shopping cart indicating whether the merchant 104 accepts coupons and/or gift certificates. For purposes of this discussion, a coupon is a code provided by the customer that entitles the customer to a discount or otherwise affects the price of the transaction. For example, a coupon can be a special promotional code that entitles the customer 102 to a 10% discount. If the merchant 104 accepts coupons, the commerce module 414 also places data in the shopping cart describing a text string asking the customer 102 to provide the coupon. For example, the text string can state "Enter Coupon," or "Please provide your express shipping code." In one embodiment, the merchant 104 also places data in the shopping cart indicating whether to apply the coupon before or after taxes. Similarly, a gift certificate is a code provided by the customer that entitles the customer to a discount due to a stored value represented by the code. If the merchant 104 accepts gift certificates, the merchant places data in the shopping cart describing a text string asking the customer 102 to provide a gift certificate. In one embodiment, a customer 102 can provide any number of coupons and/or gift certificates for a transaction.

The commerce module 414 includes information in the cart specifying whether custom calculations are used for determining the shipping rates, taxes to collect, and/or other aspects of the transaction. In one embodiment, the commerce module 414 sets flags in the cart indicating whether to use custom calculations for particular aspects of the transaction, such as shipping rates and/or taxes. In one embodiment, the commerce module 414 can specify custom calculations at a fine grain. For example, the module can specify the use of custom calculations for only some of the possible shipping methods, for only some items in the cart, and/or for shipping addresses in only some jurisdictions. Some transactions will not require any custom calculations.

If the commerce module 414 specifies custom calculations for shipping rates, taxes, coupons, and/or gift certificates, the commerce module 414 also includes the network address of the interface for performing the calculations identified in the virtual shopping cart (e.g., an HTTPS interface for a server). In one embodiment, the same network address is used for all custom calculations for a merchant 102. In other embodiments, different addresses are used for different calculations and/or carts.

In one embodiment, the commerce module 414 includes backup calculation methods in the cart for each aspect of the transaction that uses custom calculations. In another embodiment, the merchant 104 provides the backup calculation methods via a channel other than the shopping cart. For example, the merchant 104 can provide the backup methods to the broker 106 ahead of time using a direct communications link. In one embodiment, the backup calculation methods are values, such as shipping costs or tax rates, to use in place of the custom calculations. The broker 106 utilizes the backup calculation methods if the merchant-performed custom calculations fail. The merchant calculations might fail, for example, if the broker 106 is unable to contact the merchant 102 or the merchant does not reply with the results of the calculations within the specified time period.

The following is an example of a shopping cart according to one embodiment:

```
<?xml version="1.0" encoding="UTF-8" ?>
<checkout-shopping-cart
xmlns="http://checkout.google.com/schema/2-beta1">
   <shopping-cart>
      <items>
         <item>
            <item-name>Medium Pizza</item-name>
            <item-description>Medium pizza with lots of
            Lard</item-description>
            <unit-price currency="USD">12.55</unit-price>
            <quantity>1</quantity>
              <merchant-private-item-data>
              <size> Medium </size>
              <topping> Lard </topping>
              <topping> Lard </topping>
              <topping> Lard </topping>
              </merchant-private-item-data>
         </item>
      </items>
      <merchant-private-data>
         <phone>212-000-0000</phone>
      </merchant-private-data>
   </shopping-cart>
   <checkout-flow-support>
      <merchant-checkout-flow-support>
         <merchant-calculations>
            <merchant-calculations-url>http://www.example.com/
calculations </merchant-calculations-url>
            <accepts-merchant-coupons>false</accepts-merchant-coupons>
            <accepts-gift-certificates>false</accepts-gift-certificates>
         </merchant-calculations>
```

-continued

```
         <tax-tables merchant-calculated="true">
            <default-tax-table>
               <tax-rules>
                  <default-tax-rule>
                     <shipping-taxed>true</shipping-taxed>
                     <rate>0.1</rate>
                  <tax-area>
                     <us-country-area country-area="ALL"/>
                  </tax-area>
                  </default-tax-rule>
               </tax-rules>
            </default-tax-table>
         </tax-tables>
         <shipping-methods>
            <merchant-calculated-shipping name="Ground">
               <price currency="USD">3.54</price>
            </merchant-calculated-shipping>
            <merchant-calculated-shipping name="AIR">
               <price currency="USD">8.54</price>
            </merchant-calculated-shipping>
         </shipping-methods>
      </merchant-checkout-flow-support>
   </checkout-flow-support>
</checkout-shopping-cart>
```

This shopping cart contains an order for a medium pizza. The merchant 104 does not accept coupons or gift certificates for this order. Further, the shopping cart describes two possible shipping methods, "Ground" and "AIR." The cart indicates that custom calculations are used for both methods. Additionally, the cart specifies backup flat rate shipping costs of $3.54 for Ground, and $8.54 for AIR. The cart also indicates that the network address of the module performing custom calculations is "https://www.example.com/calculations."

A custom calculations module 416 performs the custom calculations in response to requests from the broker 106 and/or other entities. In one embodiment, the custom calculations module 416 is located at the network address for custom calculations identified in the shopping cart. The custom calculation module 416 need not be located within the merchant 104 and can be, for example, a separate server operated by the merchant and/or another entity.

In one embodiment, the custom calculation module 416 includes an interface for receiving a message from the broker 106 and/or another entity. This message includes enough information to allow the custom calculation module 416 to calculate shipping costs, taxes to collect, coupon and gift certificate-related discounts, and/or other custom calculations related to a transaction. In response, the custom calculation module 416 provides an answer back to the broker and/or other requesting entity that contains the results of the custom calculations. In one embodiment, the custom calculations performed by the custom calculation module 416 are idempotent (i.e., will always return the same result given the same set of inputs). A custom calculations module 416 for a busy merchant 104 might be performing thousands of custom calculations simultaneously. In one embodiment, the custom calculations module performs individual custom calculations relatively quickly (e.g., within 3 seconds).

Assume, for purposes of this description, that the virtual shopping cart created by the merchant 104 indicates to use custom calculations for shipping and taxes, and enables the use of coupons. The request message that the custom calculations module 416 receives from the broker 106 includes:

authentication information authenticating that the request message is from the broker;

a serial number uniquely identifying the request message;

a copy of the virtual shopping cart, a portion of the information in the cart, or a reference to the cart initially created by the merchant 104 (possibly transcoded into another representation);

a unique identifier of the customer;

a string describing the language used by the customer;

strings describing any coupons and/or gift certificates provided by the customer;

an identifier specifying the language of the interface being used by the end-user to conduct the transaction;

a tax calculation request;

a rate request, including:
one or more addresses to which the order might be shipped (or a partial/anonymous address, such as a ZIP code); and identifiers of one or more merchant-provided shipping methods, as indicated in the shopping cart created by the merchant.

In response to this message, the custom calculation module 416 performs the custom calculations according to merchant-specific logic, and provides a reply that includes:

for each address that was submitted in the request:

for each shipping method identified in the request:
a Boolean value indicating whether the shipping method can be used to ship to the address (if the value is false, the reply need not provide shipping costs for the method/address);

a shipping rate, e.g., the charge for shipping this order to the address via the shipping method;

a discount specifier including the amount of a discount to apply in response to coupons and/or gift certificates (e.g., a fixed amount to deduct from the total cost of the transaction), a message localized to the customer's language that describes the nature of the discount, and/or messages and data describing reasons why a coupon/gift certificate was invalid; and a sales tax amount specifying the amount of taxes to collect for the transaction.

The reply above assumes that the shipping methods utilize custom calculations. If the shipping methods are not custom calculated, only one result per address is included in the reply.

In one embodiment, the messages received and output by the custom calculation module 416 are encoded in XML. An example of a custom calculations request received by the custom calculations module 416 is as follows:

```
<?xml version="1.0" encoding="UTF-8"?>
<merchant-calculation-callback
xmlns="http://checkout.google.com/schema/2">
  <shopping-cart>
    <merchant-private-data>
      <merchant-note>affiliate code 01234</merchant-note>
    </merchant-private-data>
    <cart-expiration>
      <good-until-date>2006-12-31T23:59:59.000Z</good-until-date>
    </cart-expiration>
    <items>
      <item>
        <quantity>1</quantity>
        <unit-price currency="USD">35.00</unit-price>
        <item-name>Dry Food Pack AA1453</item-name>
        <item-description>A pack of highly nutritious dried food for emergency</item-description>
        <tax-table-selector>food</tax-table-selector>
      </item>
      <item>
        <quantity>1</quantity>
        <unit-price currency="USD">178.00</unit-price>
        <item-name>MegaSound 2GB MP3 Player</item-name>
        <item-description>Portable MP3 player - stores 500 songs</item-description>
        <merchant-private-item-data>
          <item-note>Popular item: Check inventory and order more if needed</item-note>
        </merchant-private-item-data>
      </item>
    </items>
  </shopping-cart>
  <buyer-language>en_US</buyer-language>
  <buyer-id>294873009217523</buyer-id>
  <calculate>
    <addresses>
      <anonymous-address id="739030698069958">
        <country-code>US</country-code>
        <city>Ventura</city>
        <region>CA</region>
        <postal-code>93003</postal-code>
      </anonymous-address>
      <anonymous-address id="421273450774618">
        <country-code>US</country-code>
        <city>Mountain View</city>
        <region>CA</region>
        <postal-code>94043</postal-code>
      </anonymous-address>
    </addresses>
    <tax>true</tax>
    <shipping>
      <method name="SuperShip" />
      <method name="UPS Ground" />
    </shipping>
    <merchant-code-strings>
      <merchant-code-string code="GiftCert012345" />
      <merchant-code-string code="FirstVisitCoupon" />
    </merchant-code-strings>
  </calculate>
</merchant-calculation-callback>
```

This request indicates that the customer's language is English, and includes a copy of the shopping cart as denoted by the "<shopping_cart>" tag. The request contains a gift certificate code "GiftCert012345" and a coupon code "FirstVisitCoupon." The request identifies two partial addresses, and requests that custom calculations be performed for taxes and for the "SuperShip" and "UPS Ground" shipping methods.

Further, an example of a response generated by the merchant 104 based on the request described above is:

```
<merchant-calculation-results xmlns="http://checkout.google.com/schema/2">

<result shipping-name="SuperShip" address-id="739030698069958">
      <shipping-rate currency="USD">7.03</shipping-rate>
      <shippable>true</shippable>
      <total-tax currency="USD">14.67</total-tax>
      <merchant-code-results>
        <coupon-result>
          <valid>true</valid>
```

-continued

```
            <code>FirstVisitCoupon</code>
            <calculated-amount currency="USD">5.00</calculated-amount>
            <message>Congratulations! You saved $5.00 on your first visit!</message>
         </coupon-result>
         <gift-certificate-result>
            <valid>true</valid>
            <code>GiftCert012345</code>
            <calculated-amount currency="USD">10.00</calculated-amount>
            <message>You used your Gift Certificate!</message>
         </gift-certificate-result>
      </merchant-code-results>
   </result>
   <result shipping-name="UPS Ground" address-id="739030698069958">
      <shipping-rate currency="USD">5.56</shipping-rate>
      <shippable>true</shippable>
      <total-tax currency="USD">14.67</total-tax>
      <merchant-code-results>
         <coupon-result>
            <valid>true</valid>
            <code>FirstVisitCoupon</code>
            <calculated-amount currency="USD">5.00</calculated-amount>
            <message>Congratulations! You saved $5.00 on your first visit!</message>
         </coupon-result>
         <gift-certificate-result>
            <valid>true</valid>
            <code>GiftCert012345</code>
            <calculated-amount currency="USD">10.00</calculated-amount>
            <message>You used your Gift Certificate!</message>
         </gift-certificate-result>
      </merchant-code-results>
   </result>
   <result shipping-name="SuperShip" address-id="421273450774618">
      <shipping-rate currency="USD">9.66</shipping-rate>
      <shippable>true</shippable>
      <total-tax currency="USD">17.57</total-tax>
      <merchant-code-results>
         <coupon-result>
            <valid>true</valid>
            <code>FirstVisitCoupon</code>
            <calculated-amount currency="USD">5.00</calculated-amount>
            <message>Congratulations! You saved $5.00 on your first visit!</message>
         </coupon-result>
         <gift-certificate-result>
            <valid>true</valid>
            <code>GiftCert012345</code>
            <calculated-amount currency="USD">10.00</calculated-amount>
            <message>You used your Gift Certificate!</message>
         </gift-certificate-result>
      </merchant-code-results>
   </result>
   <result shipping-name="UPS Ground" address-id="421273450774618">
      <shipping-rate currency="USD">7.68</shipping-rate>
      <shippable>true</shippable>
      <total-tax currency="USD">17.57</total-tax>
      <merchant-code-results>
         <coupon-result>
            <valid>true</valid>
            <code>FirstVisitCoupon</code>
            <calculated-amount currency="USD">5.00</calculated-amount>
            <message>Congratulations! You saved $5.00 on your first visit!</message>
         </coupon-result>
         <gift-certificate-result>
            <valid>true</valid>
            <code>GiftCert012345</code>
            <calculated-amount currency="USD">10.00</calculated-amount>
            <message>You used your Gift Certificate!</message>
         </gift-certificate-result>
      </merchant-code-results>
   </result>

</merchant-calculation-results>
```

This response includes the results of the custom calculations for two addresses, two shipping methods, a coupon, and a gift certificate.

Figure 5:
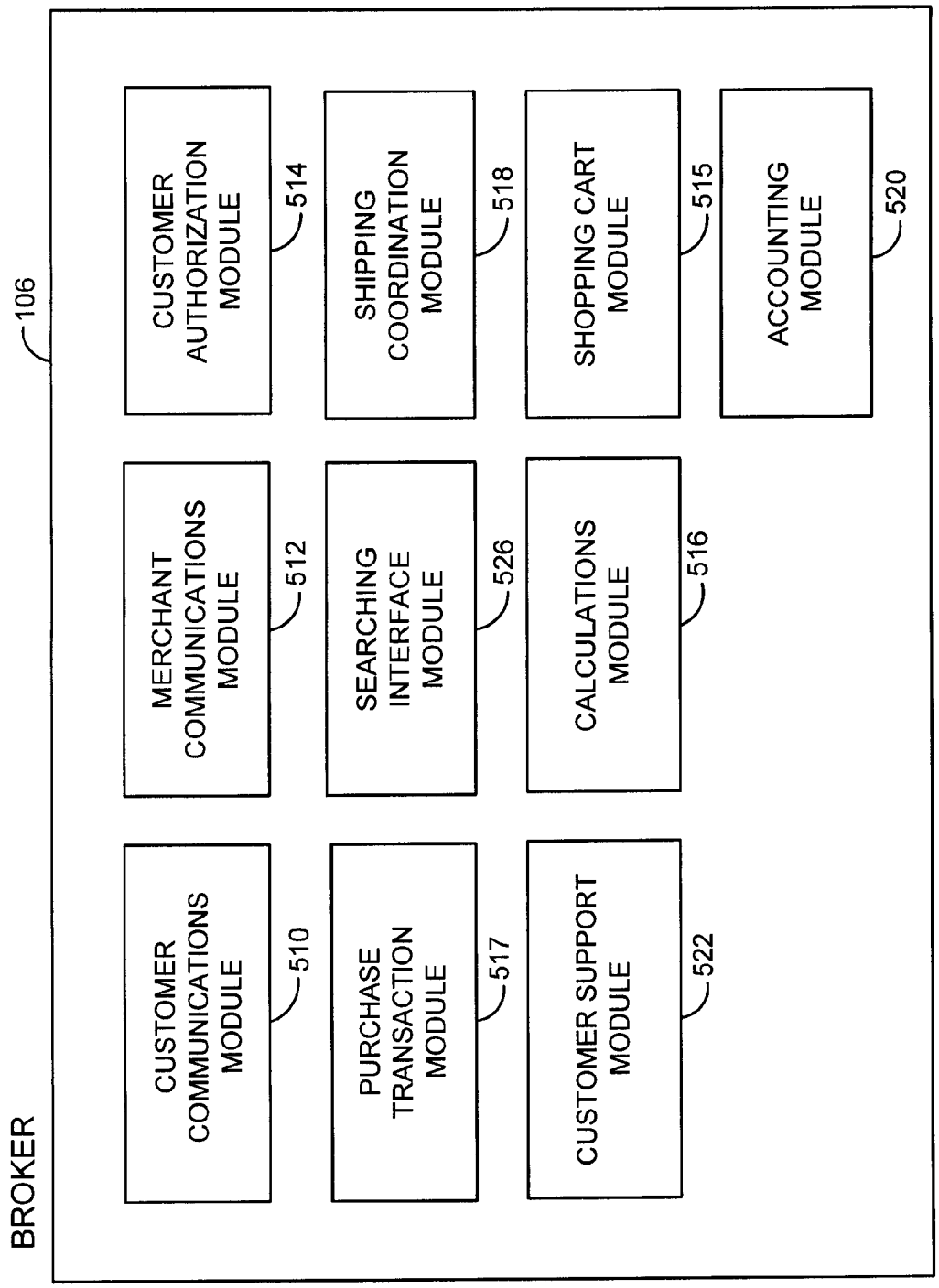
FIG. 5 is a high-level block diagram illustrating modules within the broker according to one embodiment.

FIG. 5 is a high-level block diagram illustrating modules within the broker 106 according to one embodiment. Those of skill in the art will recognize that other embodiments can have different and/or other modules than the ones described here, and that the functionalities can be distributed among the modules in a different manner.

The broker 106 includes a customer communications module 510 and a merchant communications module 512 for respectively communicating with the customer 102 and the merchant 104. In one embodiment, the customer communications module 510 uses Asynchronous JavaScript and XML (AJAX) technology to communicate with the customer 102. This technology allows the customer communications module 510 to rapidly exchange small amounts of data with the customer 102 and update portions of a web page displayed at the customer without reloading the entire page. Using AJAX thus increases the perceived responsiveness of the broker 106. In another embodiment, the customer communications module 510 uses multiple web pages to communicate with the customer 102, rather than using a single AJAX-updated page. The customer communications module 510 sends the customer 102 separate web pages as the custom calculations are performed and received from the merchant 104. In some respects, the customer 510 and merchant 512 communications modules are functionally equivalent to the customer 410 and broker 412 communications modules in the merchant 104 (and the merchant modules also use AJAX in one embodiment).

A customer authorization module 514 authenticates and authorizes customers 102 seeking to use the broker 106 for purchases. In one embodiment, the customer authorization module 514 maintains an ID, password, and/or other information for each customer 102. The customer 102 supplies the correct information in order to identify and authenticate itself. If the customer 102 is new, an embodiment of the customer authorization module 514 presents the customer with one or more web pages that allow the customer to create an account and select an ID, password and/or other identifying information. In one embodiment, the customer 102 also supplies payment information specifying a charge account and/or creating a stored value. The payment information can include, for example, a credit card number or a gift certificate identifier. The customer can also supply information including mailing/shipping addresses and settings for miscellaneous preferences. In one embodiment, the customer authorization module 514 allows a customer to conduct limited interactions with the broker 106 without establishing an account or providing identifying and/or authenticating information.

The shopping cart module 515 maintains a set of shopping carts for the customers 102. The shopping cart module 515 receives the shopping carts from the merchant 104, from the customer 102, and/or from other sources. In one embodiment, the shopping cart module 515 maintains a single shopping cart for each customer 102. In other embodiments, the shopping cart module 515 maintains multiple shopping carts per customer 102. Depending upon the embodiment, the shopping carts store items from a single merchant or from multiple merchants. In one embodiment, the shopping cart module 515 deletes shopping carts that have not been accessed within a certain time period (e.g., 90 days).

In one embodiment, a calculations module 516 in the broker 106 interacts with the custom calculations module 416 of the merchant 104, and/or performs calculations using the backup methods. In one embodiment, the calculations module 516 uses the network address specified in the cart to initiate a connection with the custom calculations module 416 upon the occurrence of an event that allows a custom calculation to be performed. These events include, for example, any one of the following:

the customer 102 providing a ZIP code or other partial address for the purpose of obtaining a shipping cost estimate;

the customer logging in to the broker 106 and thereby identifying one or more possible shipping addresses stored in the customer's profile;

the customer providing a new shipping address; and the customer providing a coupon/gift certificate code.

In one embodiment, the calculations module 516 initiates a new connection with the custom calculations module 416 each time one of these events occurs. Thus, the calculations module 516 can contact the custom calculations module 416 multiple times during one transaction. In one embodiment, the calculations module 516 maintains a persistent connection with the custom calculations module 416.

In one embodiment, the calculations module 516 sends the custom calculations module 416 the complete set of information that might be necessary to perform the custom calculations. As described above, the information includes all or some of the information in the shopping cart, all of the potential shipping addresses, and any coupon/gift certificate codes supplied by the customer 102. The calculations module 516 sends this information with every request because it is possible that the merchant will need the information for its custom calculations. For example, a coupon code might provide free shipping for only certain addresses, and thus the merchant 104 needs both the coupon code and the potential shipping addresses to perform its calculations. In one embodiment, the calculations module 516 does not send certain address information to the merchant 104, such as names, street addresses, or apartment numbers, in order to protect the customer's privacy. Similarly, in one embodiment the calculations module 516 sends one or more fake or "dummy" shipping addresses with the request in order to obfuscate the customer's true address.

The calculations module 516 receives and caches the results of the custom calculations from the merchant 104. The calculations module 516 provides the cached results to the purchase transaction module 517 to allow the latter module to dynamically update the web page provided to the customer 102 as described below. In the event that the custom calculation request fails, an embodiment of the calculations module 516 utilizes the backup calculation methods to calculate the shipping costs and/or taxes for the transaction. The transaction might fail, for example, if the merchant 104 does not respond to a custom calculation request within a predetermined latency period, e.g., 3 seconds, the merchant returns an invalid or incomplete response, and/or the broker 106 has networking problems that prevent it from communicating with the merchant. If a merchant 104 does not provide any results for a particular shipping address, an embodiment of the calculations module 516 concludes that the merchant cannot ship to that address. In another embodiment, the response from the merchant 104 includes a flag that specifically indicates whether the merchant can ship to an address.

A purchase transaction module 517 allows a customer 102 to purchase the items in a selected shopping cart without leaving the broker's domain. In one embodiment, the purchase transaction module 517 presents the customer 102 with web pages that describe the items in the cart and allow the customer to specify the methods of payment and shipping, along with any other details that are necessary and/or desired for the transaction, such as coupons. In one embodiment, the purchase transaction module 517 presents the customer 102 with a web page that the module dynamically updates as the customer makes selections and/or provides information. This updating is performed using the results of the custom calculations and/or backup calculations cached by the calculations module 516.

For example, in one embodiment, the purchase transaction module 517 provides the customer 102 with an initial web page when the customer contacts the broker 106 to purchase the items in a virtual shopping cart. This web page includes various user interface (UI) elements allowing the customer 102 to login, provide a shipping address or partial address, provide payment information, select from among previously-provided shipping addresses and payment information, and/or provide other data utilized in the transaction. If the shopping cart indicates that the merchant 104 accepts coupons and/or gift certificates, the web page displays text entry boxes for the coupon/gift certificate and the text strings from the shopping cart inviting the customer 1012 to provide the codes.

In addition, the web page displays information about the transaction, such as a description of the items in the cart, the cost and quantity of the items, estimated or actual shipping costs, applicable taxes, and a total cost for the transaction. In one embodiment, certain information on the page, such as the shipping costs, taxes, and total price, dynamically update as the customer 102 interacts with the page. Thus, the shipping costs and/or taxes are dynamically updated in real-time when the customer 102 selects a shipping address or supplies a coupon code. The updating is performed via AJAX and/or another technology.

The purchase transaction module 517 determines the total price for the transaction based on the information in the virtual shopping cart, information provided by the customer 102, and the results of any custom calculations and/or backup calculations performed by the calculations module 516. For example, in one embodiment the total price is: (the price of the item*the quantity being purchased)+shipping costs+taxes−coupon discount. The purchase transaction module 517 charges the customer 102 for the total amount, and provides the customer with a receipt.

As is apparent from the description above, the customer 102 purchases the one or more items in the shopping cart via a single session with the broker 106. The customer 102 is able to supply criteria for the purchase, such as a shipping address or coupon, directly to the broker 106. Moreover, the customer 102 can change the criteria by, for example, selecting a new shipping address, without interrupting the session with the broker 106, leaving the broker's domain, and returning to the merchant 104. In one embodiment, the entire purchase transaction between the customer 102 and the broker 106 is confined to a single, dynamically updated, web page.

Once the purchase transaction is consummated, a shipping coordination module 518 interacts with the merchant 104 to inform the merchant of the purchase and coordinate shipping of the purchased items to the customer 102. In one embodiment, the shipping coordination module 518 provides the customer's name, full shipping address, and selected shipping options to the merchant 104. In addition, the shipping coordination module 518 may provide the merchant 104 with additional contact information such as a telephone number and/or email address. Thus, the merchant 104 becomes aware of the customer's identity only after the purchase transaction completes. In other embodiments, such as for the sale of intangible goods where no shipping is required, the broker 106 does not provide the merchant 104 with the customer's name or other personally-identifiable information.

An accounting module 520 monitors the transactions that occur using the broker 106, invoices the customers 102, and credits the merchants 104. In a typical case, the accounting module 520 charges the customer's credit card or other method of payment and credits the merchant's account for the amount of the purchase. In addition, the accounting module 520 informs the merchant 104 of whether the custom calculations were successful (i.e., whether the custom calculations or backup methods were used to calculate the total price for the transaction), and provides the merchant 104 with a breakdown of the actual costs charged to the customer 102 and any coupon/gift certificate codes that were used in the transaction. This level of detail allows the merchant 104 to understand how the broker 106 calculated the purchase price. In other embodiments, the accounting module 520 does not provide the merchant 104 with detailed accounting information.

The accounting module 520 provides the merchant 104 with a notification message via the custom calculations interface that includes information about the calculations utilized in the transaction. In one embodiment, the notification message also includes the shipping options and other data from the shipping coordination module 518. The notification message has an "order-adjustment" element that includes the amounts for shipping, taxes, and each coupon and gift certificate. If the customer 102 uses a coupon or gift certificate with a higher value than the transaction cost, the amount that was applied to the transaction is reported. The notification message also indicates whether the broker 106 successfully received and utilized the complete custom merchant calculations message from the merchant 104.

The following is an excerpt of the notification message showing the order-adjustment element according to one embodiment:

```
<order-adjustment>
  <merchant-calculation-successful>true</merchant-calculation-successful>
  <merchant-codes>
    <coupon-adjustment>
      <applied-amount currency="USD">5.00</applied-amount>
      <code>FirstVisitCoupon</code>
      <calculated-amount currency="USD">5.00</calculated-amount>
      <message>Congratulations! You saved $5.00 on your first visit!</message>
    </coupon-adjustment>
    <gift-certificate-adjustment>
      <applied-amount currency="USD"> 10.00</applied-amount>
      <code>GiftCert012345</code>
      <calculated-amount currency="USD">10.00</calculated-amount>
      <message>You used your Gift Certificate!</message>
    </gift-certificate-adjustment>
  </merchant-codes>
  <total-tax currency="USD">15.06</total-tax>
  <shipping>
    <merchant-calculated-shipping-adjustment>
      <shipping-name>SuperShip</shipping-name>
      <shipping-cost currency="USD">13.00</shipping-cost>
    </merchant-calculated-shipping-adjustment>
  </shipping>
</order-adjustment>
```

A customer support module 522 allows customers 102 to request refunds and/or perform other customer-support related tasks. In one embodiment, the broker 106 provides a satisfaction guarantee and allows customers to obtain refunds on purchases with relative ease. This refund policy provides the customers 102 with added security and may make the customers more willing to purchase items from relatively unknown and/or untrustworthy merchants 104.

In one embodiment, a searching interface module 526 provides the customers 102 with access to content searching capabilities. These capabilities allow a customer 102 to provide the searching interface module 526 with a search query that specifies search parameters such as keywords, meta-data describing desired results, and/or other information and receive in return a list of content that at least partially satisfies the query. In one embodiment, the search query is generated implicitly based on actions performed by the customer 102 and/or other criteria. In one embodiment, the searching interface module 526 interfaces with a search engine provided by GOOGLE INC.® of Mountain View, Calif. The search engine searches for content, shopping carts, and/or items provided by the merchants 104 that satisfy the queries. In one embodiment, the search engine also searches other domains.

III. Process/Example

Figure 6:
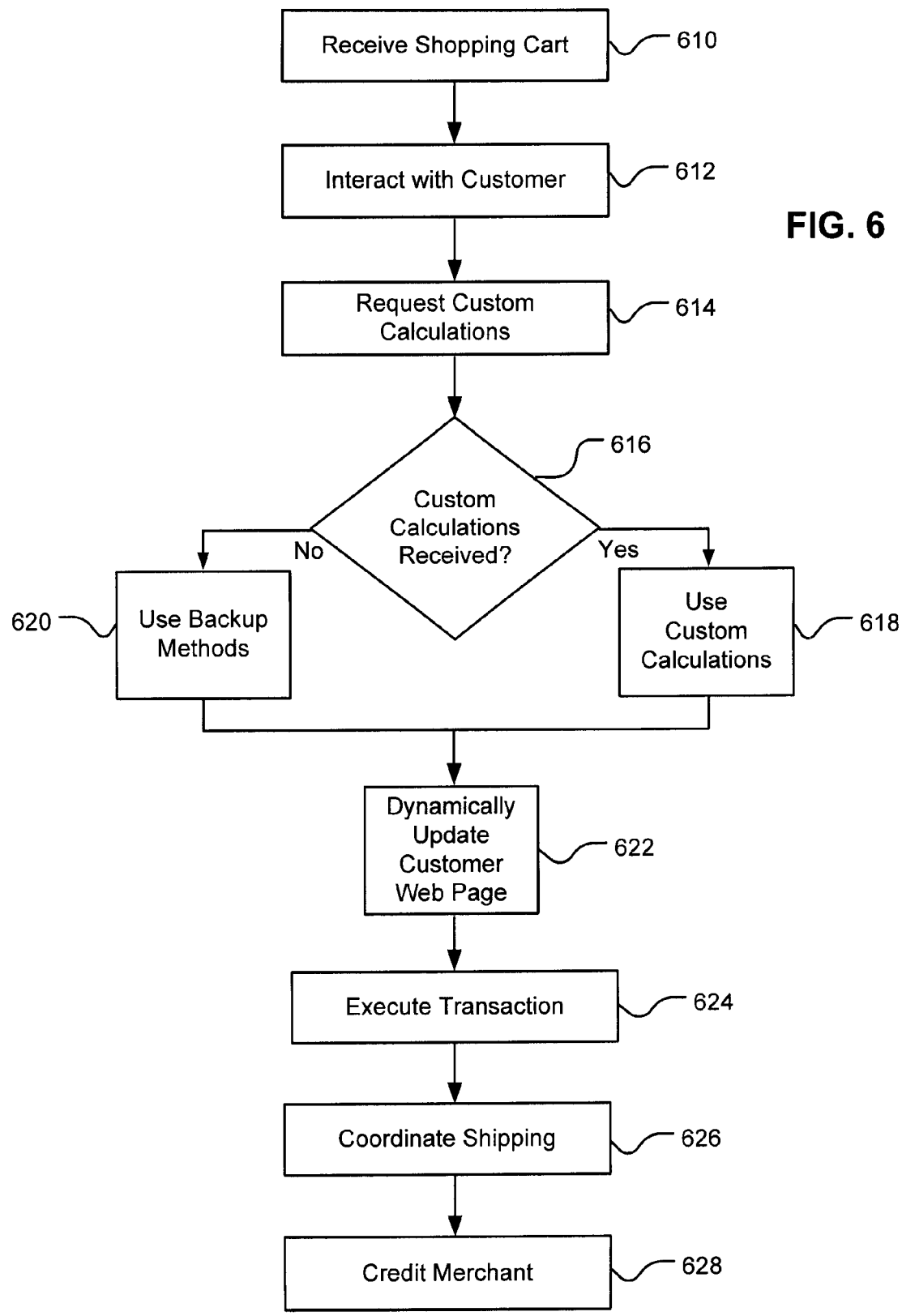
FIG. 6 is a flow chart illustrating the operation of the broker according to one embodiment.

FIG. 6 is a flow chart illustrating the operation of the broker 106 according to one embodiment of an exemplary transaction where a customer 102 interacts with a merchant 104 to establish a shopping cart containing one or more items, and then the customer interacts with the broker 106 during a single user session to purchase the items in the cart. The steps relating to the customer's interactions with the merchant 104 are not shown in the figure. Those of skill in the art will recognize that other embodiments can perform the steps of FIG. 6 in different orders. Moreover, other embodiments can include different and/or additional steps than the ones described here.

Initially, the broker 106 receives 610 the virtual shopping cart from the merchant 104 and/or customer 102. The shopping cart identifies items that the customer 102 desires to purchase. In addition, the cart specifies whether custom calculations are to be used to calculate shipping costs, taxes, and/or other aspects of the transaction. Further, the cart specifies backup calculation methods for the shipping costs, taxes, or other aspects in case the custom calculations should fail. The cart also specifies whether the broker 106 should accept coupons/gift certificates for the transaction. Assume for purposes of this example that the shopping cart specifies that custom calculations should be used for at least one aspect of the transaction.

The broker 106 interacts 612 customer 102 and the customer indicates a desire to purchase the items in the cart. During these interactions, the broker 106 presents the customer 102 with one or more web pages that allow the customer to provide information about the transaction without leaving the broker's domain. For example, the customer 102 identifies itself by logging into the broker 106. The broker 106 then retrieves one or more shipping addresses from a profile associated with the customer 102. In another example, the customer 102 enters a ZIP code or other partial address information into a input box on the web page. In a third example, the customer provides one or more coupon or gift certificate codes into a corresponding input box on the page.

The broker 106 requests 614 that the merchant 104 perform custom calculations using the information provided and/or selected by the customer 102. In one embodiment, the broker 106 requests custom calculations when the customer 102 performs actions including logging into the broker 106, adding or changing a shipping address, and/or providing a coupon or gift certificate. The broker 106 contacts a custom calculations module 416 at a network address identified in the shopping cart and provides it with the transaction information. This information can include, for example, a copy of the shopping cart received from the merchant, a partial address entered by the customer 102, one or more shipping addresses retrieved from the customer's profile, a coupon code, and/or other information.

The broker 106 waits to receive the results of the customer calculations from the custom calculations module 416. In one embodiment, the broker 106 expects to receive the custom calculations quickly. If 616 the broker 106 receives the custom calculations within the allotted time, the broker uses 618 the custom calculations for the transaction. If 616 the broker 106 does not receive the custom calculations within the allotted time, the broker uses 620 the backup methods specified by the shopping cart to perform the calculations. The broker 106 might not receive the custom calculations because of network transmission problems, an unresponsive or slow server running the custom calculations module 416, and/or another reason. If the transaction fails due to customer input, such as a invalid coupon code, one embodiment of the broker 106 asks the customer to resubmit the information and requests the custom calculation again.

Upon receiving the custom calculations and/or performing the calculations using the backup methods, the broker 106 dynamically updates the web page or pages provided to the customer 102. For example, in one embodiment the broker uses AJAX to dynamically update the web page to include the shipping cost when the customer 102 provides a ZIP code and/or selects a shipping address from among the multiple shipping addresses saved in the customer's profile.

The broker 106 calculates the total price for the transaction based on the information in the shopping cart and the results of the custom and/or backup calculations. The total price is typically based on the item price and quantity specified in the virtual shopping cart, the shipping costs and/or taxes returned as custom calculations, and/or any modifications to the price due to any coupons/gift certificates supplied by the customer 102. The broker 106 executes 624 the transaction by charging the customer's credit card, subtracting a value from a stored value account, and/or performing an equivalent action. The broker 106 coordinates 626 shipping with the merchant 104. In one embodiment, the broker 106 supplies the customer-selected shipping address and method to the merchant 104 and instructs the merchant to ship the purchased items directly to the customer 102. The broker 106 credits 628 the merchant 104 for the transaction and provides it with an accounting of the fees charged to the customer 102. This accounting can take the form of an email and/or XML-encoded message that describes which custom merchant calculations were utilized in the transaction and/or how the broker 106 arrived at the total price.

The electronic commerce system 100 thus allows the merchant 104 to calculate shipping costs, taxes, effects of coupons/gift certificates, and/or other aspects of the transaction that utilize complex business logic and/or have a tight dependence on the merchant's internal state. Plus, using a broker 106 as described above avoids exposing any personally-identifiable customer information to the merchant 104 until after the transaction completes. Further, using a broker 106 as described above allows a customer 102 to purchase items in a single session with the broker 106, without needing to leave the broker's domain to change aspects of the transaction. As a result, customers 102 are more likely to purchase items from smaller or relatively unknown merchants which the customers might otherwise be reluctant to patronize.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of conducting an electronic commerce transaction with a customer, comprising:
receiving, by a broker computer system, data representative of a virtual shopping cart for a customer from a remote merchant, the cart identifying an item offered by the merchant for purchase in an electronic commerce transaction by the customer and indicating that a custom calculation is used for the electronic commerce transaction;

identifying, by the broker computer system, customer information regarding the transaction by interacting with the customer at a domain of the broker computer system;

providing, by the broker computer system, the customer information to the remote merchant and requesting from the merchant a result of the custom calculation utilizing the customer information;

receiving, by the broker computer system, the result of the custom calculation from the remote merchant, the result based at least in part on a calculation performed by the merchant using the customer information;

calculating, by the broker computer system, a price for the transaction responsive to the result of the custom calculation received from the remote merchant; and conducting, by the broker computer system, the electronic commerce transaction with the customer at the calculated price without the customer leaving the domain of the broker computer system.

2. The method of claim 1, where in the result of the custom calculation describes shipping costs, taxes to collect, and/or a discount to apply for the electronic commerce transaction.

3. The method of claim 1, wherein identifying customer information regarding the transaction comprises identifying one or more shipping addresses associated with the customer.

4. The method of claim 1, wherein identifying customer information regarding the transaction comprises identifying one or more coupons or gift certificates provided by the customer.

5. The method of claim 1, wherein providing the customer information to the merchant comprises providing, by the broker computer system, a plurality of shipping addresses to the merchant indicating where the item offered by the merchant may be shipped and requesting a cost of shipping the item to each of the plurality of shipping addresses.

6. The method of claim 5, wherein one or more of the plurality of shipping addresses is a fake shipping address obfuscating the customer's real shipping address from the merchant.

7. The method of claim 5, further comprising receiving, by the broker computer system, results of custom calculations indicating a cost of shipping to each of the plurality of shipping addresses using each of a plurality of possible shipping methods included by the remote merchant in the shopping cart.

8. The method of claim 7, further comprising:
providing, by the broker computer system, a web page to the customer, the web page displaying the price for the transaction; and
dynamically updating, by the broker computer system, the price displayed on the web page using the results of the custom calculations responsive to selection of one of the shipping methods and/or shipping addresses by the customer.

9. The method of claim 1, further comprising providing, by the broker computer system, one or more web pages to the customer at the domain of the broker computer system, the web pages displaying results of the custom calculation and enabling the customer to conduct the electronic commerce transaction with the broker computer system.

10. The method of claim 1, wherein calculating the price for the transaction comprises:
identifying, by the broker computer system, a backup method for performing the custom calculation;
utilizing, by the broker computer system, the backup method to perform the custom calculation and produce a backup result responsive to a failure to receive from the merchant a valid response to the custom calculation request; and
calculating, by the broker computer system, the price for the transaction responsive to the backup result.

11. The method of claim 10, wherein identifying the backup method comprises analyzing the virtual shopping cart to identify a backup method specified therein.

12. The method of claim 10, wherein the backup method is utilized responsive to a failure to receive from the merchant a valid response within a specified time limit.

13. The method of claim 1, further comprising analyzing, by the broker computer system, the data representative of the virtual shopping cart to identify a network address of a server for performing the custom calculation; wherein the providing step provides the customer information to the server at the network address.

14. The method of claim 1, further comprising notifying the merchant of the conducted transaction and describing how the price was determined.

15. A system for conducting an electronic commerce transaction with a customer, comprising:
a storage device: and
a processor communicatively coupled to the storage device, wherein the processor executes application code instructions that are stored in the storage device and that cause the system to:
receive data representative of a virtual shopping cart for the customer from a remote merchant, the cart identifying an item offered by the remote merchant for purchase by the customer and indicating that a custom calculation is used for the transaction;
identify, customer information regarding the transaction through interactions with the customer at a domain of the system;
provide the customer information to the remote merchant and request from the remote merchant a result of a custom calculation based at least in art on the provided customer information;
receive the result of the custom calculation from the remote merchant;
calculate, a price for the transaction responsive to the result of the custom calculation received from the remote merchant; and
conduct the electronic commerce transaction with the customer at the determined calculated price without the customer leaving the domain of the system.

16. The system of claim 15, wherein the result of the custom calculation request describes shipping costs, taxes to collect, and/or a discount to apply for the electronic commerce transaction.

17. The system of claim 15, wherein the identified customer information comprises one or more shipping addresses associated with the customer.

18. The system of claim 15, wherein the identified customer information comprises one or more coupons or gift certificates provided by the customer.

19. The system of claim 15, wherein providing customer information comprises providing a plurality of shipping addresses to the merchant indicating where the item offered by the merchant may be shipped and requesting a cost of shipping the item to each of the plurality of shipping addresses.

20. The system of claim 19, wherein one or more of the plurality of shipping addresses is a fake shipping address obfuscating customer's real shipping address from the merchant.

21. The system of claim 19, wherein the processor further executes application code instructions that cause the system to receive from the merchant results of custom calculations indicating a cost of shipping to each of the plurality of possible shipping addresses using each of a plurality of shipping methods provided by the remote merchant in the shopping cart.

22. The system of claim 21, wherein the processor further executes application code instructions that cause the system to:
provide a web page to the customer, the web page displaying the price for the transaction; and
dynamically update the price displayed on the web page using the results of the custom calculations responsive to selection of one of the shipping methods and/or shipping addresses by the customer.

23. The system of claim 15, wherein the processor further executes application code instructions that cause the system to provide one or more web pages to the customer at the domain of the system, the web pages displaying results of the custom calculation and enabling the customer to conduct the electronic commerce transaction with the system.

24. The system of claim 15, wherein the processor further executes application code instructions that cause the system to:
identify a backup method for performing the custom calculation,
utilize the backup method to perform the custom calculation, and produce a backup result responsive to a failure to receive from the merchant a valid response to the custom calculation request, and
calculate the price from the transaction responsive to the backup result.

25. The system of claim 24, wherein identifying the backup method comprises analyzing the virtual shopping cart to identify a backup method specified therein.

26. The system of claim 24, wherein the backup method is utilized responsive to a failure to receive from the merchant a valid response within a specified time limit.

27. The system of claim 15, wherein the processor further executes application code instructions that cause the system to analyze the data representative of the virtual shopping cart to identify a network address of a server for performing the custom calculation, and to provide the customer information to the server at the network address.

28. The system of claim 15, wherein the processor further executes application code instructions that cause the system to notify the merchant of the conducted transaction and describing how the price for the transaction was determined.

29. A computer program product comprising a non-transitory computer-executable storage device having computer executable instructions embodied thereon that when executed by a computer cause the computer to conduct an electronic commerce transaction with a customer, the computer executable instructions comprising:
computer-executable instructions to receive from a remote merchant data representative of a virtual shopping cart for the customer, the cart identifying an item offered by the remote merchant for purchase by the customer and indicating that a custom calculation is used for the transaction;
computer-executable instructions to identify customer information regarding the transaction through interactions with the customer at a domain of a broker;
computer-executable instruction to provide the customer information to the remote merchant and request a custom calculation from the remote merchant based at least in part on the provided customer information; and
computer-executable instruction to receive a result of the custom calculation from the remote merchant;
computer-executable instructions to calculate a price for the transaction responsive to receiving the custom calculation from the remote merchant;
computer-executable instructions to conduct an electronic commerce transaction with the customer at the calculated price without the customer leaving the domain of the broker.

30. The computer program product of claim 29, wherein the result of the custom calculation request describe shipping costs, taxes to collect, and/or a discount to apply for the electronic commerce transaction.

31. The computer program product of claim 29, wherein the identified customer information comprises one or more shipping addresses associated with the customer.

32. The computer program product of claim 29, wherein the identified customer information comprises one or more coupons or gift certificates provided by the customer.

33. The computer program product of claim 29, wherein providing the customer information comprises providing a plurality of shipping addresses to the merchant indicating where the item offered by the merchant may be shipped and requesting a cost of shipping the item to each of the plurality of shipping addresses.

34. The computer program product of claim 33, further comprising computer-executable program instructions to receive from the merchant results of custom calculations indicating a cost of shipping to each of the plurality of shipping addresses using each of a plurality of possible shipping methods indicated in the shopping cart received from the merchant.

35. The computer program product of claim 34, further comprising computer-executable program instructions to:
provide a web page to the customer, the web page displaying the price for the transaction; and
dynamically update the price displayed on the web page using the results of the custom calculations responsive to selection of one of the shipping methods and/or shipping addresses by the customer.

36. The computer program product of claim 29, wherein one or more of the plurality of shipping addresses is a fake shipping address obfuscating customer's real shipping address from the merchant.

37. The computer program product of claim 29, further comprising computer-executable program instruction to provide one or more web pages to the customer at the domain of the broker, the web pages displaying results of the custom calculation and enabling the customer to conduct the electronic commerce transaction with the broker.

38. The computer program product of claim 29, wherein calculating the price for the transaction comprises identifying a backup method for performing the custom calculation, utilizing the backup method to perform the custom calculation and produce a backup result responsive to a failure to receive from the merchant a valid response to the custom calculation request, and providing the backup result to the purchase transaction module as the result of the custom calculations request.

39. The computer program product of claim 38, wherein the back-up method comprises analyzing the virtual shopping cart to identify a backup method specified therein.

40. The computer program product of claim 38, wherein the backup method is utilized responsive to a failure to receive from the merchant a valid response within a specified time limit.

41. The computer program product of claim 29, further comprising computer-executable instructions to analyze the data representative of the virtual shopping cart to identify a network address of a server for performing the custom calculation, and to provide the customer information to the server at the network address.

42. The computer program product of claim 29, further comprising computer-executable instructions to notify the merchant of the conducted transaction and describing how the price for the transaction was determined.

* * * * *